United States Patent [19]
Yamamoto

[11] Patent Number: 5,777,412
[45] Date of Patent: Jul. 7, 1998

[54] THROTTLE ACTUATOR

[75] Inventor: Kyouhei Yamamoto, Tokyo, Japan

[73] Assignee: Mitsubishi Denki Kabushiki Kaisha, Tokyo, Japan

[21] Appl. No.: 858,563

[22] Filed: May 19, 1997

[30] Foreign Application Priority Data

Jan. 13, 1997 [JP] Japan .................................. 9-003932

[51] Int. Cl.$^6$ .................................. H02K 7/14; F02D 9/08
[52] U.S. Cl. .......................... 310/83; 123/337; 251/129.11
[58] Field of Search .................................. 310/15, 17, 28, 310/29, 83; 123/337; 251/129.11, 129.12

[56] References Cited

U.S. PATENT DOCUMENTS 3,897,843  8/1975  Hapeman et al. ............... 310/67 R X
5,687,691  11/1997  Kaiser et al. ..................... 123/337

FOREIGN PATENT DOCUMENTS 5-240070  9/1993  Japan.

*Primary Examiner*—Steven L. Stephan
*Assistant Examiner*—Judson H. Jones
*Attorney, Agent, or Firm*—Sughrue, Mion, Zinn, Macpeak & Seas, PLLC

[57] ABSTRACT

A throttle actuator including driving means having a stator provided with a stator winding and a rotor provided with a sun gear at a rotating shaft thereof, planetary speed reducing means having the sun gear at the rotating shaft, a stationary gear installed at an outer periphery side of the sun gear and a planet gear in mesh with the sun gear and the stationary gear for performing a planetary motion by rotating the rotor, a planetary gear support pin supporting the planet gear and performing a revolutionary motion along with the planet gear, and a planetary arm disposed between the planetary gear support pin and a valve shaft of a throttle valve.

7 Claims, 4 Drawing Sheets

THROTTLE ACTUATOR

BACKGROUND OF THE INVENTION

1. Field of the Invention

The present invention relates to a throttle actuator operating a throttle valve installed in a suction passage of an internal combustion engine.

2. Discussion of Background

There has been publicly known a device where a throttle valve is operated by a motor-driven actuator via a reduction gear mechanism disclosed in, for example, Japanese Unexamined Patent Publication No. JP-A-5-240070. According to the publicly-known example, in a device where a brushless motor is used in the motor-driven actuator, installation of a reduction gear mechanism to lower a current switching frequency in respect of a stator winding and avoid high accuracy formation of a rotational angle detecting device, is disclosed and integration of spur gears each having external teeth is disclosed as a reduction gear mechanism disposed between the brushless motor and the throttle valve.

Such a throttle actuator is directly mounted to a throttle body of an internal combustion engine. In this case, not only a throttle actuator having excellent mountability is naturally required but also, in the case of an internal combustion engine for a vehicle, a small-sized one is strongly required above all in view of layout of an engine compartment. However, when spur gears each having external teeth are used in a speed reducing means as described in the publicly-known example, it is necessary to provide as an offset a distance between a rotating shaft of a motor as an actuator and a valve shaft of a throttle valve by an amount in correspondence with a sum of radii of the respective gears installed to the respective shafts, or to pile up gears in the axial direction by using idle gears when no space for offset is provided. In either of the cases it is difficult to downsize actuators, the mountability is deteriorated since the amount of the offset is increased and the layout inside the engine compartment becomes problematic when the speed reduction ratio is increased whereby the diameter of a gear on the side of the valve shaft is also increased.

SUMMARY OF THE INVENTION

The present invention has been carried out in order to solve the above-described problems. It is an object of the present invention to provide a throttle actuator having excellent mountability by enabling to provide a valve shaft of a throttle valve and a rotating shaft of an actuator on the same axis line and by downsizing the actuator including a reduction gear mechanism and further, capable of reducing a number of parts.

According to a first aspect of the present invention, there is provided a throttle actuator comprising driving means having a stator provided with a stator winding and a rotor provided with a sun gear at a rotating shaft thereof, planetary speed reducing means having the sun gear at the rotating shaft, a stationary gear installed at an outer periphery side of the sun gear and a planet gear in mesh with the sun gear and the stationary gear for performing a planetary motion by rotating the rotor, a planetary gear support pin supporting the planet gear and performing a revolutionary motion along with the planet gear and a planetary arm disposed between the planetary gear support pin and a valve shaft of a throttle valve.

According to a second aspect of the present invention, there is provided a throttle actuator according to the first aspect, wherein the rotating shaft of the driving means and the valve shaft of the throttle valve are arranged on a same axis line.

According to a third aspect of the present invention, there is provided a throttle actuator according to the first aspect, further comprising a mechanism for restraining an amount of pivoting the planetary arm by being brought into contact with the planetary arm.

According to a fourth aspect of the present invention, there is provided a throttle actuator according to the first aspect, wherein one end of the rotating shaft is supported by a bearing installed at an end potion of the valve shaft.

According to a fifth aspect of the present invention, there is provided a throttle actuator according to the first aspect, further comprising a connector for supplying a field current to the stator winding and a bearing support member for supporting other end of the rotating shaft, wherein the connector and the bearing support member are integrally constituted.

According to a sixth aspect of the present invention, there is provided a throttle actuator according to the first aspect, further comprising a bearing support member for supporting other end of the rotating shaft, wherein the stationary gear of the planetary speed reducing means and the bearing support member are integrally constituted.

According to a seventh aspect of the present invention, there is provided a throttle actuator according to the first aspect, further comprising a connector for supplying a field current to the stator winding and a frame for the stator, wherein the connector and the frame are integrally molded.

DETAILED DESCRIPTION OF THE PREFERRED EMBODIMENTS

EMBODIMENT 1

Figure 1:
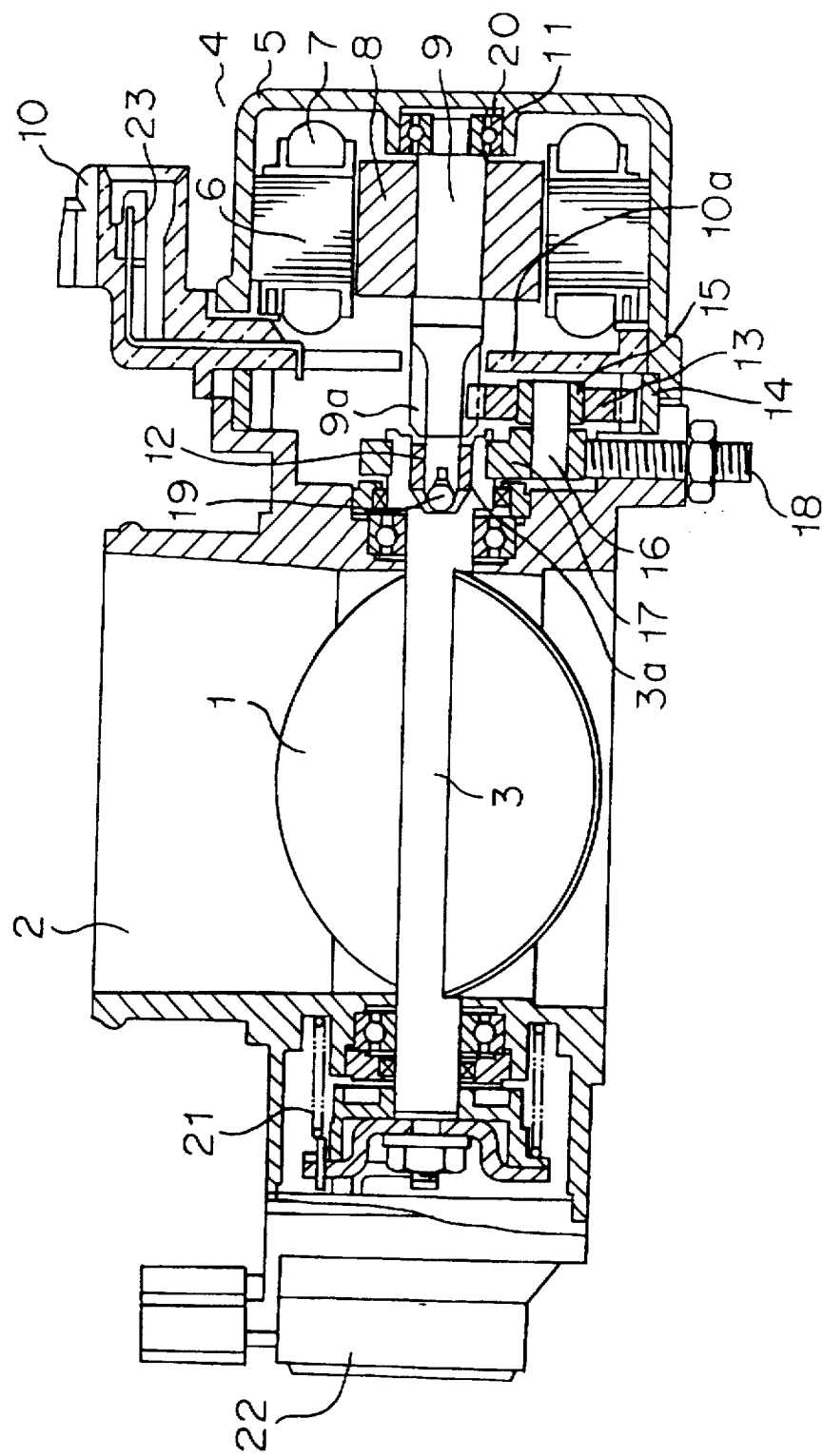
FIG. 1 is a sectional view showing the constitution of Embodiment 1 of the present invention.
Figure 2:
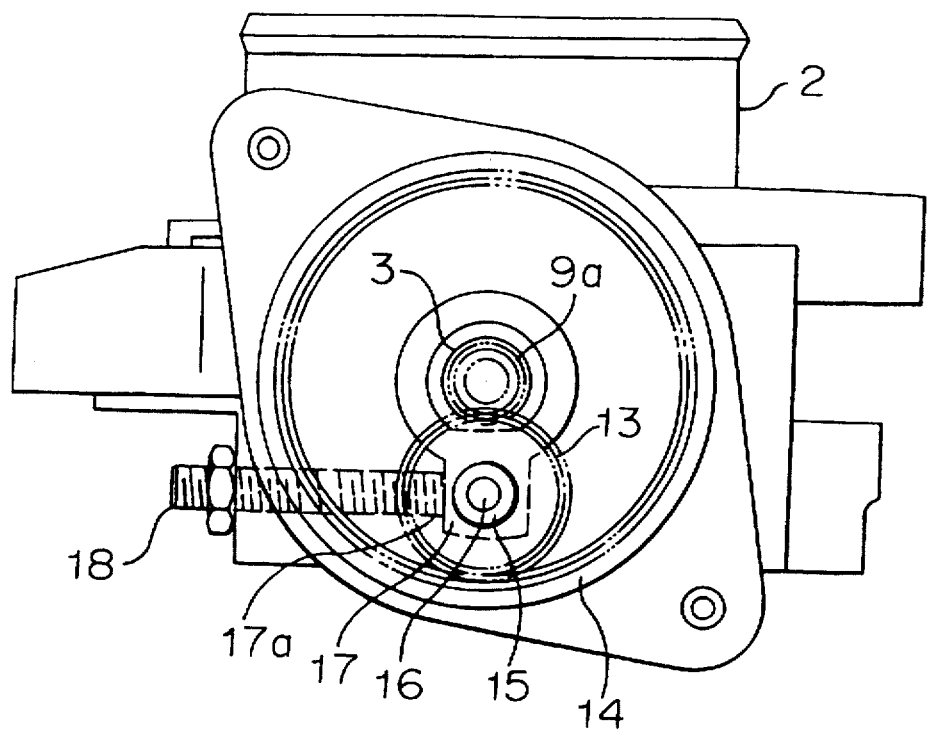
FIG. 2 is a plane view showing a reduction gear mechanism of Embodiment 1 of the present invention.

FIG. 1 and FIG. 2 show the constitution of a throttle actuator according to Embodiment 1 of the present invention where FIG. 1 is a sectional view thereof and FIG. 2 is a plane view of a reduction gear mechanism. Referring to FIG. 1 and FIG. 2, numeral 1 designates a throttle valve installed to a throttle body 2 that is a suction passage of an internal combustion engine for controlling an intake air amount and numeral 3 designates a valve shaft attached with the throttle valve 1 for opening and closing the throttle valve 1 by pivoting the shaft. Numeral 4 designates a brushless motor constituted by a frame 5, a stator core 6 attached to the frame 5, a stator winding 7 wound around the stator core 6, a rotor 8 receiving a rotating force by a field system of the stator winding 7, a rotating shaft 9 for supporting the rotor 8 which is installed on the same axis line as that of the valve shaft 3 and a connector 10 for supplying power from a controller, not shown, to the stator winding 7. One end of the rotating shaft 9 of the brushless motor 4 is supported by the frame 5 via a bearing 11 and the other end thereof is supported by a bottomed hole 3a of the valve shaft 3 via a bearing 12. A sun gear 9a of a planetary speed reducing mechanism is installed to the outer periphery of the rotating shaft 9 on the side of the valve shaft 3.

Numeral 13 designates a planet gear in mesh with the sun gear 9a and a stationary gear 14 fixed to the throttle body 2 and the frame 5. These gears constitute the planetary speed reducing mechanism where the planet gear 13 is supported by a planet gear support pin 16 via a bearing 15 at a center of rotation thereof and the planet gear support pin 16 is attached to a planetary arm 17 fixed to the valve shaft 3. Numeral 18 designates a stopper for restricting a pivotal motion of the planetary arm 17 and accordingly, a pivotal motion of the valve shaft by being brought into contact with a contact face 17a of the planetary arm 17 where the stopper 18 is screwed in the throttle body 2 and is adjusted to restrain the pivotal motion of the planetary arm 17 by being brought into contact with the contact face 17a of the planetary arm 17 at a fully closed state of the throttle valve 1. Further, notation 10a designates a partition member constituted integrally with the connector 10, which is arranged near to the outer periphery of the rotating shaft 9 for separating the speed reducing mechanism and a motor portion and which is constituted to restrict the axial position of the planet gear 13. Incidentally, numeral 19 designates a spherical thrust bearing interposed between the bottomed hole 3a of the valve shaft 3 and the rotating shaft 9, which positions the rotating shaft 9 in the axial direction along with a corrugated washer 20 installed to the bearing 11. Also, numeral 21 designates a return spring for urging the throttle valve 1 in the direction of closing the throttle valve 1, numeral 22 designates a sensor for detecting a rotational angle of the throttle valve 1 and numeral 23 designates a metal terminal of the connector 10.

When power is supplied to the stator winding 7 and the rotor 8 is rotated by a magnetic field of the stator winding 7, the sun gear 9a of the rotating shaft 9 is rotated and the planet gear 13 in mesh with the sun gear 9a performs a planetary motion by being revolved on the inner periphery of the stationary gear 14 while being rotated. The revolution of the planet gear 13 is transmitted to the valve shaft 3 via the planetary gear support pin 16 and the planetary arm 17 and the valve shaft 3 is pivoted with a speed reduced by a speed reduction ratio determined by a gear ratio of the sun gear 9a and the stationary gear 14 whereby the intake air amount of the engine is controlled.

According to the throttle actuator of Embodiment 1 of the present invention constituted as described above, the planetary speed reducing mechanism is used as the speed reducing mechanism in controlling the degree of opening of the throttle valve by driving the motor and accordingly, the rotating shaft 9 of the brushless motor 1 and the valve shaft 3 can be installed on the same axis line whereby a throttle actuator provided with a small-size and extremely excellent mountability can be obtained.

Further, the bottomed hole 3a is installed at the valve shaft 3 supported by the throttle body 2 and one end of the rotating shaft 9 of the brushless motor 4 is supported by the valve shaft 3 and therefore, a bracket for a bearing of the brushless motor 4 can be abolished whereby further downsizing and reduction in the number of parts can be realized.

Furthermore, the stopper mechanism for holding the fully closed position of the throttle valve 1 along with the return spring 21 for rendering the throttle valve 1 in the fully closed state when the actuator is not operated, is installed to the planetary arm 17 of the speed reducing mechanism and accordingly, the strength of the device can be ensured while downsizing the device which also amounts to promotion in reliability. Furthermore, the planet gear 13 is positioned and the speed reducing mechanism and motor portion are separated by the partition member 10a constituted integrally with the connector 10 and accordingly, a detachment preventive mechanism of the planet gear 13 can be abolished whereby the device can be downsized and at the same time lubricant grease of the speed reducing mechanism and the like can be prevented from invading the motor portion.

EMBODIMENT 2

Figure 3:
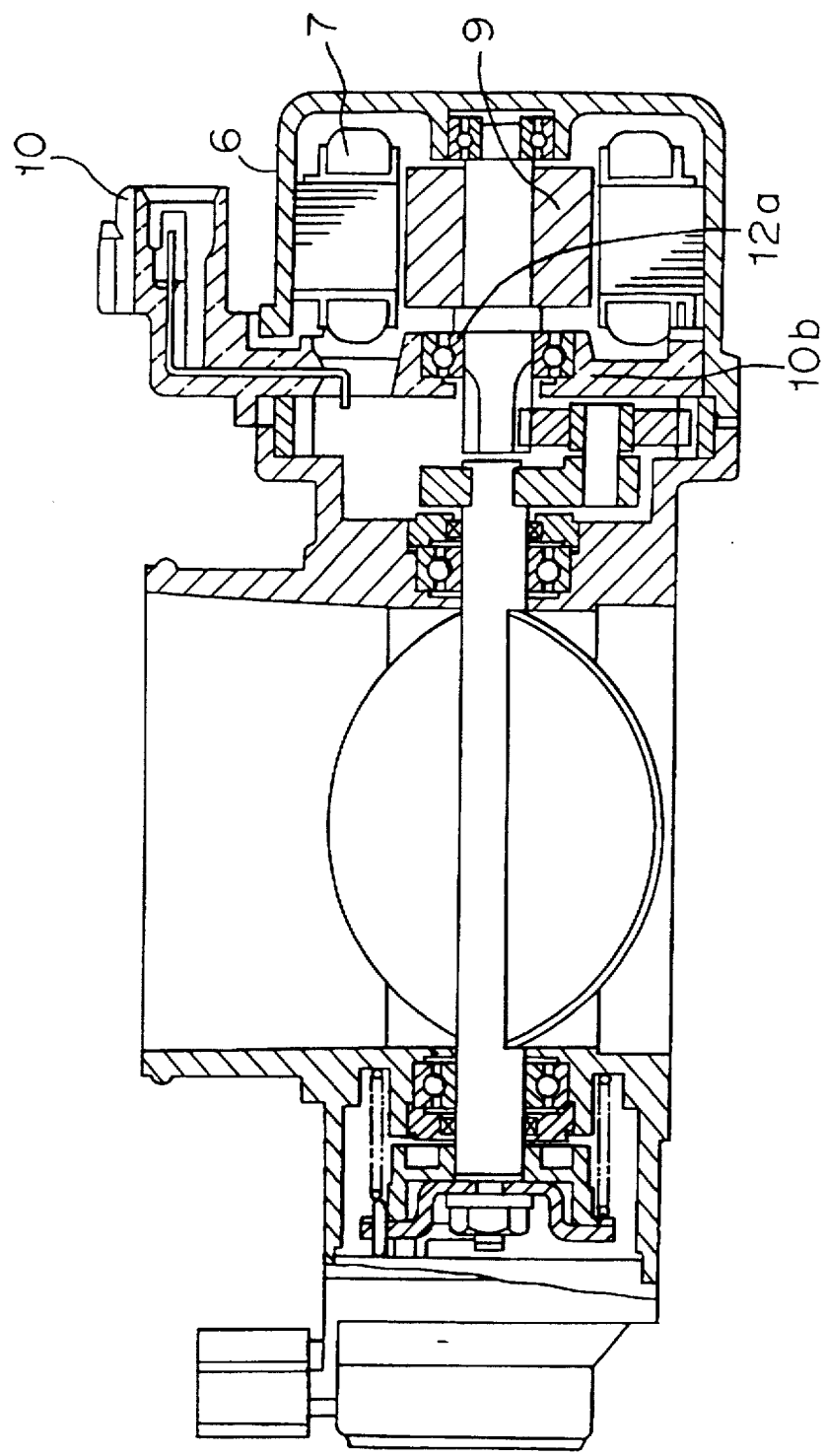
FIG. 3 is a sectional view showing the constitution of Embodiment 2 of the present invention.

FIG. 3 is a sectional view showing the constitution of a throttle actuator according to Embodiment 2 of the present invention. According to Embodiment 2, a bearing support portion 10b is installed integrally with the connector 10 for supplying electricity to the stator winding 7 of the throttle actuator, one end of the rotating shaft 9 of the brushless motor is supported by a bearing 12a mounted to the bearing support portion 10b and the axial position of the planet gear 13 can be restrained by the bearing support portion 10b. According to the throttle actuator of Embodiment 2 constituted as described above, similar to the case of Embodiment 1, a bracket for holding one of the bearings of the brushless motor is not needed by which not only the device can be downsized and the number of parts can be reduced but also the speed reducing mechanism is completely separated from the motor portion whereby lubricant grease of the speed reducing mechanism and the like can be completely prevented from invading the motor portion.

EMBODIMENT 3

Figure 4:
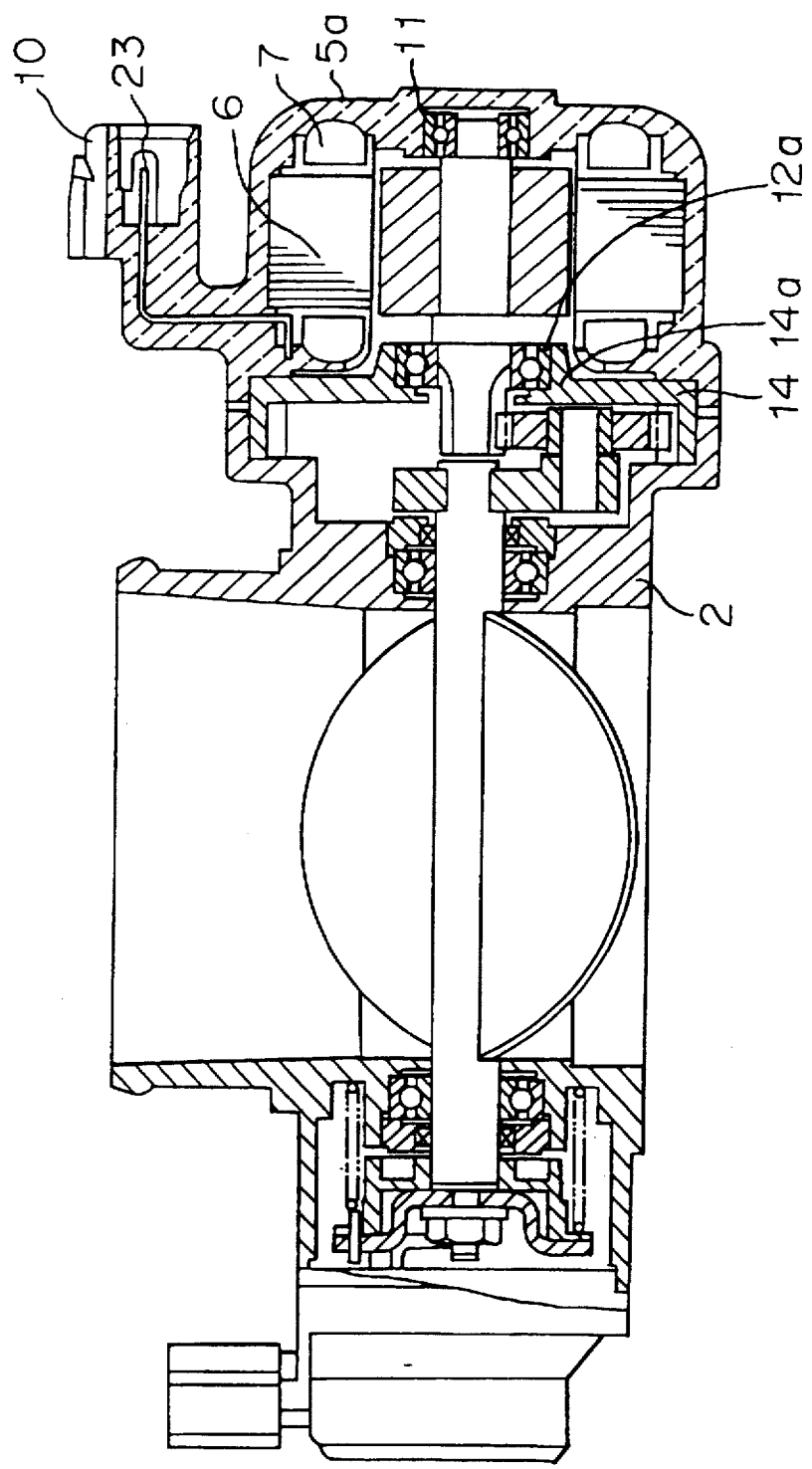
FIG. 4 is a sectional view showing the constitution of Embodiment 3 of the present invention.

FIG. 4 is a sectional view showing a throttle actuator according to Embodiment 3 of the present invention. According to Embodiment 3, the connector 10 for supplying power to the stator winding 7 and a frame 5a for holding the stator core 6 and the like of the throttle actuator, are integrally molded by a molding material. Further, a bearing support portion 14a which holds the bearing 12a and becomes a detachment preventive member of the planet gear 13, is constituted integrally with the stationary gear 14 held between the frame 5a and the throttle body 2. According to the throttle actuator of Embodiment 3 constituted as describe above, the connector 10 and the frame 5a can be integrally molded in one step with the stator core 6, the metal terminal 13 and the like as insert materials. Accordingly, the productivity can be promoted and the downsizing of the device can be realized. Further, a bracket for holding one of the bearings of the brushless motor is dispensed with similar to Embodiment 2 by which the device can be downsized and the number of parts can be reduced, the speed reducing mechanism can completely be separated from the motor portion and lubricant grease of the speed reducing mechanism and the like can completely be prevented from invading the motor portion.

According to the throttle actuator of the present invention, the rotating shaft of the brushless motor is coupled with the valve shaft of the throttle valve via the planet gear of the speed reducing mechanism. Therefore, the rotating shaft and the valve shaft can be arranged on the same axis line whereby the throttle actuator which is small-sized and excellent in the mountability can be obtained. Since the rotating shaft and the valve shaft can be arranged on the same axis line, one end of the rotating shaft is supported by the valve shaft by which the device can further be downsized and the layout of an engine compartment can be facilitated.

Further, the portion for supporting one of the bearings of the motor is constituted by the connector and the stational gear of the planetary speed reducing mechanism, whereby separation of the speed reducing mechanism from the motor portion and detachment prevention of the planet gear are conducted. Therefore, the throttle gear capable of being downsized and capable of reducing the number of parts where lubricant grease of the speed reducing mechanism is prevented from invading the motor portion, can be obtained.

Furthermore, the stopper for the fully closed state of the throttle valve is constituted by utilizing the planetary arm of the planetary speed reducing mechanism and accordingly, not only the throttle actuator which is small-sized and provided with high reliability can be obtained but also the connector and the frame of the motor can be integrally molded whereby the device can be downsized and the productivity can be promoted.

What is claimed is:

1. A throttle actuator comprising:

driving means having a stator provided with a stator winding and a rotor provided with a sun gear at a rotating shaft thereof;

planetary speed reducing means having the sun gear at the rotating shaft, a stationary gear installed at an outer periphery side of the sun gear and a planet gear in mesh with the sun gear and the stationary gear for performing a planetary motion by rotating the rotor;

a planetary gear support pin supporting the planet gear and performing a revolutionary motion along with the planet gear; and a planetary arm disposed between the planetary gear support pin and a valve shaft of a throttle valve.

2. The throttle actuator according to claim 1, wherein the rotating shaft of the driving means and the valve shaft of the throttle valve are arranged on a same axis line.

3. The throttle actuator according to claim 1, further comprising:

a mechanism for restraining an amount of pivoting the planetary arm by being brought into contact with the planetary arm.

4. The throttle actuator according to claim 1, wherein one end of the rotating shaft is supported by a bearing installed at an end potion of the valve shaft.

5. The throttle actuator according to claim 1, further comprising:

a connector for supplying a field current to the stator winding;

a bearing support member for supporting other end of the rotating shaft; and wherein the connector and the bearing support member are integrally constituted.

6. The throttle actuator according to claim 1, further comprising:

a bearing support member for supporting other end of the rotating shaft; and wherein the stationary gear of the planetary speed reducing means and the bearing support member are integrally constituted.

7. The throttle actuator according to claim 1, further comprising:

a connector for supplying a field current to the stator winding;

a frame for the stator; and wherein the connector and the frame are integrally molded.

* * * * *